C. T. HENDERSON.
VARIABLE SPEED CONTROLLER.
APPLICATION FILED JULY 29, 1913.

1,233,877.

Patented July 17, 1917.

Witnesses:
Robert H. Weir
R. H. Van Net

Inventor:
Clark T. Henderson
Edwin B. H. Tower Jr. atty.

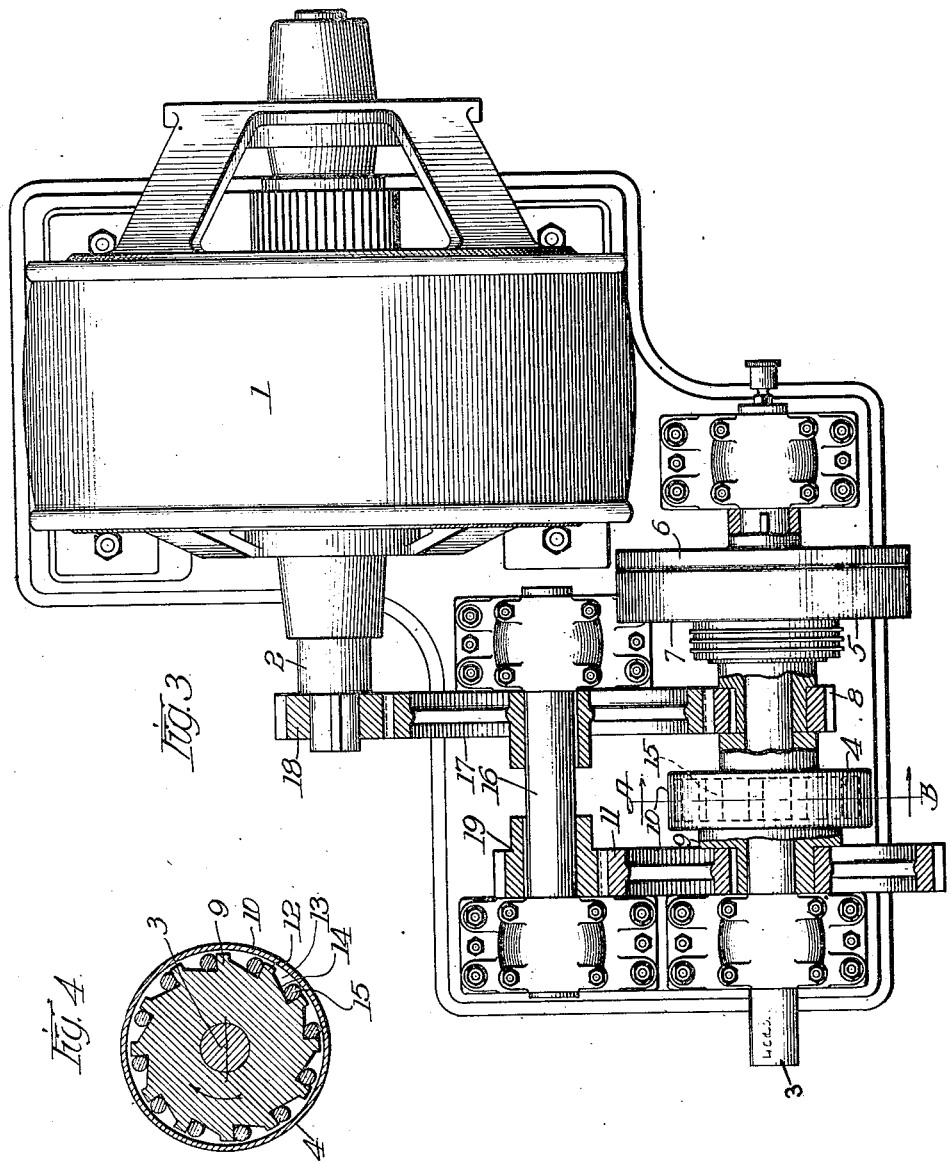

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

VARIABLE-SPEED CONTROLLER.

1,233,877.    Specification of Letters Patent.    Patented July 17, 1917.

Application filed July 29, 1913. Serial No. 781,725.

*To all whom it may concern:*

Be it known that I, CLARK T. HENDERSON, a citizen of the United States, residing at Milwaukee, in the county of Milwaukee and State of Wisconsin, have invented new and useful Improvements in Variable-Speed Controllers, of which the following is a full, clear, concise, and exact description, reference being had to the accompanying drawing, forming a part of this specification.

This invention relates to variable speed controllers.

The invention is particularly applicable to the control of variable speed electric motors employed to drive variable speed mechanisms. Variable speed mechanisms are generally provided with mechanical or other gearing, by means of which various speeds may be obtained. There are, however, undesirable limitations upon the use of gearing alone to effect speed changes. Thus the range of speed is limited since each set of gears causes the mechanism to be driven at a definite speed ratio with respect to the speed of the driving means. Also the transition from one speed to the next is generally so abrupt as to be objectionable. By employing a variable speed electric motor as the driving means, however, a wide range of speed may be obtained and the transition from one set of gearing to another may be made as gradual as desired.

In order to obtain a gradual change of speed over a wide range it is necessary to vary the motor speed whenever a change is made from one set of gearing to another and also to vary the motor speed while the mechanism is being driven through each set of gears.

Furthermore, when a change is made from a low speed drive to a higher speed, the load on the motor will be proportionately increased so that it becomes necessary to provide means for preventing an abnormal inrush of current to the motor and also to hold down the voltage at the motor terminals to allow sufficient latitude for increasing the voltage to effect speed changes in the motor.

Heretofore it has been proposed to employ a single resistance for controlling the motor. This has necessitated reinserting the resistance in circuit at each change in gearing, thereby greatly complicating the motor controller.

An object of this invention is to simplify the controller for the variable speed electric motor. According to this invention a sufficient resistance is provided to protect the motor under all conditions of service and to obtain the required speed variations. Means are provided whereby a portion of this resistance may be varied while one set of gearing is being employed, and whereby another portion may be varied as each successive set of gearing is being employed.

The improved controller has been illustrated as employed in connection with an improved variable speed mechanism employing two sets of gears.

While the controller is particularly adapted for use in connection with the variable speed mechanism illustrated, it is, of course, apparent that it is in no wise limited to such use, as it may be made in various forms for use with different mechanisms. Accordingly the invention is only diagrammatically illustrated so that in practice it may be embodied in the form best suited to the conditions.

In the accompanying drawings—

Fig. 3 is a plan view, partially in section, of the variable speed mechanism disclosed in my prior application.

Fig. 4 is a section on the line A—B of Fig. 3.

Figure 1:
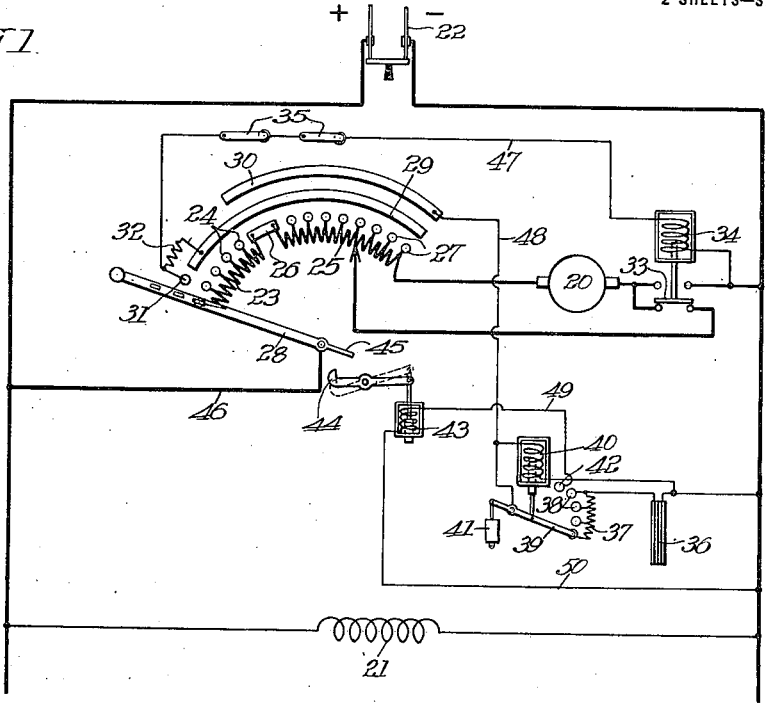
Figure 1 illustrates diagrammatically one form of the improved controller.

Fig. 3 illustrates an electric motor 1 provided with an armature shaft 2. Power is transmitted through various gears to drive the driven shaft 3 at either a high or low speed. The machine to be driven is geared, or otherwise connected, to the shaft 3. The shaft 3 carries a mechanical clutch 4 and an electro-magnetic clutch 5. The magnetic clutch is provided with an armature member 6 fixed to the shaft and a magnet member 7 freely rotatable thereon. A pinion 8 is fixed to the magnet member of the clutch.

The mechanical clutch has an inner member 9 loose on the shaft 3 and an outer member 10 fixed to the shaft. A gear 11 is fixed to the inner member of the mechanical clutch. The mechanical clutch is preferably a one-way ball or roller clutch. The inner member of the clutch is provided with radial projections 12, between which are recesses 13 having inclined bottoms 14. Balls or rollers 15 are arranged in these recesses between the inner and outer clutch members. Upon rotation of the inner member in the direction indicated by the arrow, Fig. 4, the rollers will crowd to the narrow ends of the recesses until they wedge between the outer and inner clutch members, thus causing the outer member to rotate with the inner. Should the outer member be driven at a higher speed than the inner member, the rollers will roll back to the wider ends of the recesses, thus releasing the members from each other.

A counter shaft 16 carries a gear 17 which meshes with a pinion 18 on the armature shaft and with the pinion 8, and also carries a pinion 19 meshing with the gear 11. It is apparent, therefore, that if the magnetic clutch is deënergized, a low speed drive will be effected from the motor shaft through the pinion 18, gear 17, counter shaft 16, pinion 19, gear 11, and the mechanical clutch to the driven shaft 3. The magnet member of the magnetic clutch will also rotate, but ineffectively since the magnetic clutch is deënergized. Upon energization of the magnetic clutch a high speed drive will be effected through gear 17, pinion 8 and the magnetic clutch. This will cause disengagement of the mechanical clutch members since the outer member will be driven at a higher speed than the inner member.

By making the ratios of pinion 18 to gear 17 one to three, gear 17 to pinion 8 three to one, and pinion 19 to gear 11 one to three, a low speed driving ratio of one to nine may be obtained, or a high speed ratio of one to one. These ratios are merely illustrative and may be varied as desired.

Fig. 1 illustrates diagrammatically the preferred form of controller. The electric motor is illustrated as provided with an armature 20 and a shunt field 21. A shunt motor has been selected merely because it is well adapted for this type of service and may be readily controlled, although any suitable motor may, of course, be employed. Current for the motor and for energizing the magnetic clutch is supplied from suitable mains through the main switch 22. Control of the motor is preferably obtained by means of resistance in the armature circuit. This resistance comprises the section 23 provided with contacts 24 and the section 25 connected to the section 23 by contact 26 and provided with contacts 27. A pivoted controller arm 28, electrically connected to the positive main, is adapted to successively contact with the contacts 24, 26 and 27. The arm 28 is also adapted to contact with segments 29 and 30 for purposes hereinafter described. The segment 29 has an auxiliary contact 31 in advance of the segment and connected thereto by a resistance 32.

The motor circuit is controlled by an electro-magnetic switch 33 operated by a coil 34 connected between the segment 29 and the negative main. When the coil is energized the switch bridges contacts in the motor armature circuit to start the motor, and when the coil is deënergized the switch opens the motor circuit and completes a short circuit through the armature and a suitable section of the resistance for dynamic braking. Manual switches or push-buttons 35 control the circuit for the switch solenoid.

The magnetic clutch has its magnet coil 36 connected between the segment 30 and the negative main. An automatic rheostat is provided in the clutch circuit whereby the strength of current may be gradually increased to cause the clutch to gradually pick up the load. This automatic rheostat comprises a resistance 37 provided with contacts 38 and an arm 39 adapted to engage these contacts in succession. The arm 39 is operated by a coil 40 connected in a shunt around the clutch magnet. Upon closure of the clutch circuit by the controller arm 28 the rheostat arm will move, retarded by the dashpot 41, to gradually cut the resistance 37 out of the clutch circuit. As the last step of resistance 37 is cut out, the arm 39 engages a contact 42 which controls a circuit for a solenoid 43 for releasing a latch 44 which coöperates with a projection 45 on the controller arm for a purpose hereinafter described.

The operation of the controller will now be described. As illustrated, all the circuits are open and the motor is at rest. Upon moving the contact arm 28 to the right into engagement with contact 31, the switch solenoid 34 will be energized by the circuit from the positive main through conductor 46, controller arm 28, contact 31, conductor 47, and switches 35 to the negative main. This will close the motor switch and armature current will flow from the positive lead through both sections of the resistance in series to start the motor. Under these conditions the variable speed mechanism will be driven through the low speed gear and variations in speed may be obtained by moving the controller arm back and forth over the contacts 24. When the controller arm engages the segment 29, the resistance 32 is inserted in the circuit of the motor switch solenoid to reduce the current therein to an amount simply sufficient to maintain the switch closed. When the arm has been moved into engagement with the contact 26, the maximum speed with the low gearing is obtained since all the low speed resistance section 23 has been cut out of the motor circuit. In this position the controller arm engages the segment 30, thus energizing the magnetic clutch through the resistance 37. The latch 44, which normally occupies the full line position indicated on the drawing, will engage the projection 45 on the controller arm to prevent acceleration of the motor until the magnetic clutch has reached its maximum strength due to the cutting-out of the resistance 37. As soon as the rheostat arm 39 reaches its fully operated position, a circuit will be closed through the latch coil from the controller arm, through segment 30, conductor 48, arm 39, contact 42, conductor 49, coil 43 and conductor 50 to the negative main. The latch will immediately be drawn to the dotted line position illustrated and the controller arm may then be moved back and forth over resistance 25 to vary the motor speed during the operation of the mechanism by the high speed gearing.

Figure 2:
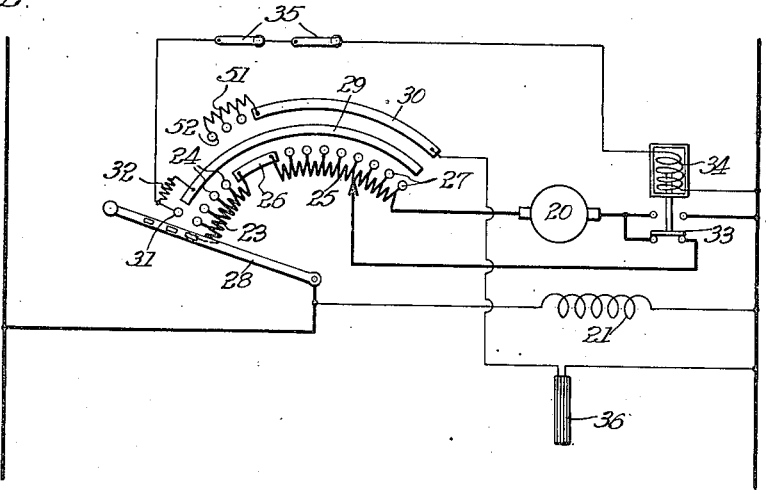
Fig. 2 illustrates diagrammatically a modified arrangement thereof.

Fig. 2 illustrates a modified arrangement of the controller circuits. In this modification, a resistance 51, provided with contacts 52, is connected to the segment 30 in position to be engaged by the controller arm before the arm engages the segment. With this arrangement the automatic rheostat in the clutch circuit and the latch 44 may be dispensed with. It will be readily understood from the drawing that as the controller arm engages the contact 52, the clutch circuit will be completed through the resistance 51. Further movement of the arm will increase the effectiveness of the clutch by cutting out successive steps of resistance from the clutch circuit. The relative arrangement of contacts is preferably such that the controller arm does not come into contact with the first contact 27 of motor resistance 25 until the magnetic clutch has reached its maximum energization.

It is apparent that this invention provides a simple controller for variable speed mechanisms which, by a single movement of a controller arm in one direction, will start the driving motor, cause the motor to accelerate to its maximum speed with one set of gearing in operation, automatically cause the motor to drive through the next set of gearing, and, thereafter, cause acceleration of the motor to its maximum speed with this set of gearing. At the same time sufficient resistance is always provided to properly protect the motor as the load varies with changes in the driving gear ratio.

What I claim as new and desire to secure by Letters Patent of the United States is:

1. In combination, a driven shaft, a variable speed driving motor therefor, means for varying the driving ratio between said motor and shaft, and means for controlling said motor, said means comprising a resistance divided into sections corresponding in number to the variations in driving ratio, and a single controller arm for varying the resistance of said sections.

2. In a variable speed mechanism, in combination, a driven shaft, a driving motor therefor, a plurality of sets of gears for connecting said motor and said shaft for different speed ratios, power operated means for effecting substitution of one of said sets of gears for another, a controller for varying the speed of said motor through a predetermined range and means associated with said controller for effecting a gradual transition from one of said speed ratios to another through the medium of said power operated means at an intermediate and substantially constant speed of said motor.

3. In a variable speed mechanism, a variable speed driving motor, a plurality of sets of driving gears between said motor and the driven mechanism, a resistance divided into sections corresponding in number to the sets of driving gears, a controller arm movable over said resistance sections, in succession, to vary the same, and means controlled by said arm for bringing into operation the set of gears corresponding to the section of resistance over which said controller arm is being moved.

4. In a variable speed mechanism, in combination, a driven shaft, a driving motor therefor, a plurality of sets of gears for connecting said motor and said shaft for different speed ratios, electromagnetic means for effecting substitution of one of said sets of gears for another, a variable resistance for controlling the speed of said motor through a predetermined range, controlling means for said resistance and means associated with said controlling means for energizing said electromagnetic means and for varying the action thereof to effect a gradual transition from one speed ratio to another at an intermediate and substantially constant speed of said motor.

5. In a variable speed mechanism, a variable speed driving motor, a plurality of driving connections between said motor and mechanism for driving the latter at varying speed ratios, one of said connections including a magnetic clutch, a controlling resistance for said motor, a controller arm for varying said resistance, said arm, in one position, also controlling said magnetic clutch, means for causing said clutch, when energized, to gradually become effective, and means for insuring a maximum efficiency in said clutch before said resistance may be further varied to accelerate said motor.

6. In a variable speed mechanism, a variable speed driving motor, electro-magnetic means for varying the driving connections between said motor and mechanism, means for causing said electro-magnetic means, when energized, to gradually become efficient, a variable resistance for controlling said motor, a controller arm adapted to move over said resistance to vary the same, said arm, at an intermediate point in its movement, serving also to control said magnetic means, and means whereby said arm is ineffective to vary said resistance beyond said intermediate point until said electro-magnetic means has reached maximum efficiency.

7. In a variable speed mechanism, a variable speed driving motor, a low speed driving connection between said motor and mechanism, a resistance for controlling said motor while said low speed connection is in operation, a controller arm for varying said resistance, a high speed driving connection between said motor and mechanism, said connection including a magnetic clutch, means for causing said clutch, when energized, to gradually increase in efficiency to insure a gradual transition from low to high speed, and a resistance for controlling said motor while said high speed connection is in operation, said controller arm also serving to control said magnetic clutch and said high speed resistance by successive movements in the same direction.

8. In a variable speed mechanism, in combination, a driven shaft, a driving motor therefor, a plurality of sets of gears for connecting said motor and said shaft for different speed ratios, an electromagnetic clutch for effecting substitution of one of said sets of gears for another and controlling means for said motor and said clutch including two variable resistances, one for varying the speed of said motor through a predetermined range and the other for varying the action of said clutch, said latter resistance functioning to effect a gradual transition from one speed ratio to another through said clutch at an intermediate speed of said motor.

9. In combination, a variable speed mechanism, a variable speed driving motor therefor, a motor switch, a controlling resistance for varying the speed of said motor, means for changing the driving ratio between said motor and mechanism, said means including a magnetic clutch, a resistance for controlling the energization of said clutch, and a controller arm movable through successive steps in the same direction to close said switch, vary said motor resistance and control said magnetic clutch and its aforesaid resistance.

10. In combination, a variable speed mechanism, a variable speed driving motor therefor, a controlling resistance for said motor, driving means between said motor and mechanism, said means including a magnetic clutch, a coil for said clutch, an automatic rheostat for controlling the energization of said coil, a controller arm for varying said resistance and controlling the circuit of said coil and rheostat, means coöperating with said arm for holding it in an intermediate position, and means controlled by said automatic rheostat for releasing said holding means.

11. In combination, a mechanism to be driven, a variable speed driving motor therefor, driving connections including a magnetic clutch between said motor and mechanism, a coil for said clutch, a resistance in series with said coil, a controlling resistance for said motor, and controlling means governable by a single handle for varying said motor-controlling resistance and for completing the circuit for said clutch coil and varying the resistance in series therewith.

12. In combination, a driven member, a driving motor therefor, operative connections between said motor and said member including means for varying the driving ratio, and a common controller for said motor and said ratio changing means operable to effect operation of said means after partial acceleration of said motor and thereafter further accelerate said motor.

13. In combination, a driven member, a driving motor therefor, operative connections between said motor and said member including means for varying the driving ratio, and a common controller for said motor and said ratio changing means including a resistance for the motor, said controller being operable to remove a limited portion of said resistance from circuit, effect operation of said means and remove the remainder of said resistance from circuit progressively.

14. In combination, a driven member, a driving motor therefor, operative connections between said motor and said member, electromagnetic means controlling said connections to vary the driving ratio, a resistance for the motor and controlling means for said resistance adapted to energize said electromagnetic means upon removal of a limited part of said resistance from circuit and to thereafter remove the remainder of said resistance from circuit.

In witness whereof, I have hereunto subscribed my name in the presence of two witnesses.

CLARK T. HENDERSON.

Witnesses:
F. H. HUBBARD,
J. F. WATSON.